3,365,406
STABILIZATION OF CRYSTALLINE POLYPRO-
PYLENE WITH A COMBINATION OF TRI-
ALKYL PHENOL, DITHIO BIS PHENOL AND
THIODIPROPIONIC ESTERS
Adam F. Kopacki, Westwood, N.J., and Gerald Levine,
Brooklyn, N.Y., assignors to Stauffer Chemical Company, New York, N.Y., a corporation of Delaware
No Drawing. Filed July 5, 1962, Ser. No. 207,797
9 Claims. (Cl. 260—23)

This invention relates to the stabilization of isotactic or highly crystalline polypropylene. More particularly, the invention pertains to the stabilization of the aforesaid polypropylene by means of a monosubstituted phenolic disulfide synergized with a combination of a sterically hindered 2,6-dialkyl-4-methylphenol and a dialkyl ester of 3,3'-thiodipropionic acid.

A recent development in the polymerization art is the synthesis of stereoregular polymers. These are precisely constructed polymers, the monomeric units of which are linked up in an end-to-end fashion thereby forming elongated molecular chains. Moreover, the substituents attached to the chain are systemically disposed, an arrangement which tends to promote an orderly and close alignment of the filamentary-like molecules. Such stereoregular polymers exhibit a high degree of crystallinity and are much superior in physical properties to amorphous polymers having a random distribution of substituents affixed to the molecular chain. For a fuller description of crystalline polymers, reference is made to the Scientific American, 197 No. 3, pp. 98–104 (1957); 205 No. 2, pp. 33–41 (1961).

A stereoregular polymer of the polyolefin type which has recently attracted wide attention is crystalline polypropylene. Because of i's superior physical properties, this crystalline polymer has been extensively developed and is now available on the commercial market in a variety of forms including castings, films and fibers.

The highly crystalline polypropylenes have melt indices when measured at 190° C. ranging from about 0.01 to 50 and it is this physical characteristic which renders these polymers particularly useful in the production of synthetic fibers and films. Other desirable and beneficial physical properties of crystalline polypropylene include exceptional transparency, high mechanical strength and resistance to chemicals and solvents.

Despite the excellent physical chemical properties of crystalline polypropylene, it is unfortuna'ely susceptible to deterioration at elevated temperatures apparently as a result of oxidative degradation. The rapidity with which crystalline polypropylene undergoes air oxidation is readily demonstrated by heating melt spun polypropylene fibers in a circulating air oven at 125° C. At the end of 50 hours, the fibers have lost about 50% of their strength and such treatment for 100 hours reduces them to a powdery material.

Generally all of the polypropylenes are more or less subject to air oxidation as above described, although the crystalline or stereoregular variety is especially prone to this type of degradation. It is interesting to note that a closely related polyolefin, i.e. polyethylene is not appreciably affected by air oxidation and fibers of this latter material are known to withstand 100° C. temperatures for hundreds of hours without serious loss in strength.

Manifestly, polypropylene and in particular the highly crystalline variety, requires stabilization against oxidative degradation and numerous varieties of anti-oxidants have been proposed in an effort to suppress or at least retard this undesirable feature of polypropylene. For instance, it is known to stabilize polyethylene with certain bis (di- alkyl phenol) sulfides, including monosulfides and disulfides and these have been proposed as stabilizers for polypropylene including the isotactic variety. In general, however, the aforesaid disubstituted bis phenolic sulfides have not proven to be particularly effective in the polypropylene system probably due to the greater susceptibility of isotactic polypropylene to oxidative degradation.

An improved type of bis phenolic sulfide stabilizer is described in pending U.S. application Serial No. 163,069 filed Dec. 29, 1961 now abandoned. These compounds are characterized by two phenolic residues connected through a monothio or dithio bridge and having one hydrocarbon substituent attached to each of the phenol rings. The preferred configuration contains the dithio bridge. Such monosubstituted bis phenols have demonstrated a higher degree of stabilizing action than the monosubstituted derivatives when incorporated in polypropylene of the predominantly crystalline variety.

It has now been discovered that the stabilization of crystalline polypropylene by means of bis phenolic disulfide stabilizers disclosed in the above referred to application can be greatly increased when they are used in combination with a sterically hindered 2,6-dialkyl-4-methylphenol and a dialkyl ester of 3,3'-thiodipropionic acid and the provision of isotactic or crystalline polypropylene stabilized with such materials constitutes the primary object and purpose of this invention. Other objects and purposes will become apparent as the description proceeds.

In general, it has been our finding that excellent protection of the polymer can be achieved by intimately blending it with the bis phenolic disulfide stabilizer and the synergistic mixture of sterically hindered 2,6-dialkyl-4-methylphenol and 3,3'-thiodipropionic acid dialkyl ester, the blending being continued until the components have been thoroughly homogenized. Normally the phenolic disulfide constitutes from about 0.05% to about 5% of the stabilized composition. In most instances it has been determined that about 0.5% of the phenolic stabilizer insures the desired protection of the crystalline polypropylene while at the same time causing no alteration in physical properties in the polymer such as changes in color, strength, or the like. With respect to the synergistic combination, minor amounts of these components are required to produce a synergistic effect. We have for instance found that optimum protection of the polymer ensues when the synergist combination comprises about 0.01 to 0.5% of the sterically hindered phenol and about 0.05 to 5.0% of the dialkyl ester of 3,3'-thiodipropionic acid, based on the polymer composition.

The monosubstituted phenolic sulfides which are utilized as the primary stabilizing agents in preparing the polymer compositions of the invention are in most instances known compounds and can be depicted by the following structural formula:

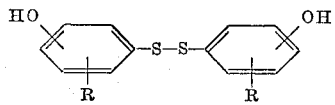

wherein R designates a hydrocarbon residue and can be an alkyl radical of from 1 to 20 carbon atoms, e.g. methyl, ethyl, isopropyl, n-propyl, n-butyl, tert-butyl, sec-butyl, n-amyl, sec-amyl, tert-amyl, n-hexyl, sec-hexyl, n-heptyl, sec-heptyl, tert-octyl, sec-octyl, isooctyl, nonyl, decyl, dodecyl, tridecyl, n-tetradecyl, pentadecyl, hexadecyl, heptadecyl, octadecyl, etc., an aralkyl radical, e.g. benzyl, phenethyl, etc., a cycloalkyl radical, e.g. cyclopentyl, cyclohexyl, etc. or an aromatic hydrocarbon radical of the benzene series, e.g. phenyl, lower alkoxyl phenyl, lower alkyl phenyl, etc. The preferred configuration is that wherein the R and OH substituents are never meta to each other and the OH function is excluded from occupying a position meta to the disulfide bridge.

It is to be understood that the aforenamed bis phenols are symmetrical structures and that the phenolic functions and the R groups each occupy similarly disposed positions on the aromatic rings.

Exemplary bis phenols falling within the ambit of the above depicted general formula include the following:

Compound 1.—4,4'-dithiobis (2-sec-amylphenol)

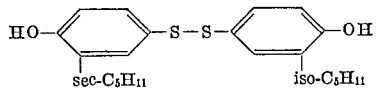

Compound 2.—4,4'-dithiobis (2-isopropylphenol)

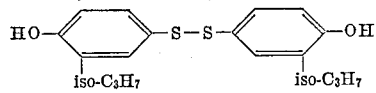

Compound 3.—4,4'-dithiobis (2-cyclohexylphenol)

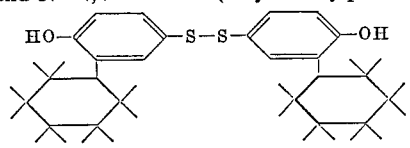

Compound 4.—4,4'-dithiobis (2-tert-butylphenol)

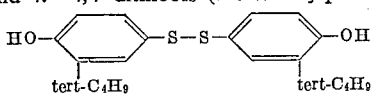

Compound 5.—4,4'-dithiobis (2-phenylphenol)

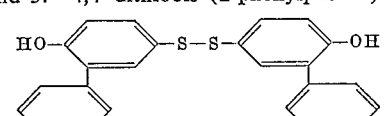

Compound 6.—4,4'-dithiobis (2-sec-butylphenol)

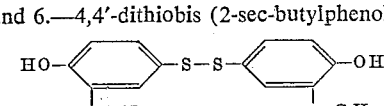

Compound 7.—2,2'-dithiobis (4-tert-octylphenol)

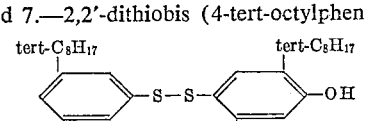

Compound 8.—2,2'-dithiobis (4-isopropylphenol)

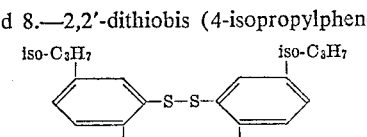

Compound 9.—2,2'-dithiobis (4-sec-butylphenol)

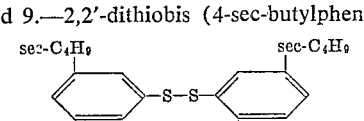

Compound 10.—4,4'-dithiobis (2-cyclopentylphenol)

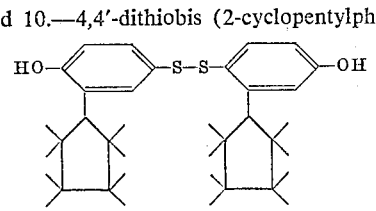

Compound 11.—4,4'-dithiobis (2-n-tetradecylphenol)

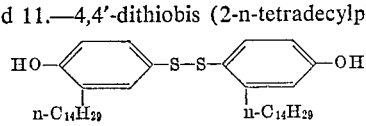

Compound 12.—4,4'-dithiobis (2-benzylphenol)

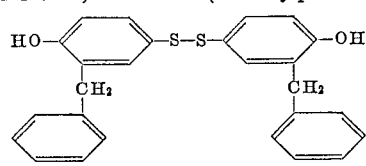

Compound 13.—2,2'-dithiobis (4-p-methoxyphenylphenol)

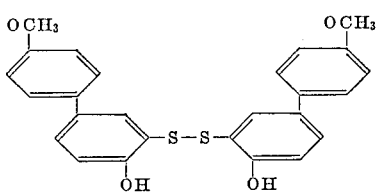

Compound 14.—4,4'-dithiobis (2-p-tolylphenol)

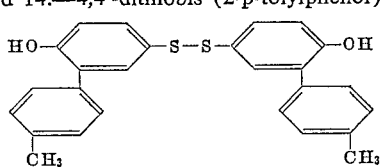

Compound 15.—4,4'-dithiobis (2-methylphenol)

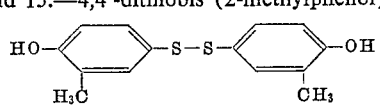

The bis (monoalkylphenol) disulfides as used herein can be prepared by reacting approximately 2 moles of a monocylic phenol having a hydrocarbon substituent affixed to the No. 2 or 4 position with sulfur dichloride. The synthetic procedure is generally patterned after the method as set forth in British Patent 796,285.

The sterically hindered 2,6-dialkyl-4-methylphenols preferably contain highly branched alkyl radicals, each having from 3 to 12 carbon atoms. In general, it has been our finding that the 2,6-ditertiary alkyl-4-methylphenols operate the most effective when used as a component in the synergizing composition of the invention.

As previously noted elsewhere herein, optimum results are achieved by thoroughly admixing the stabilizer and synergist combination with the polypropylene. In this connection a simple method consists in dissolving the stabilizer adjuncts in a low boiling solvent such as hexane or the like and thoroughly mixing the solution with the raw polymer usually in flake or other convenient form and evaporating the solvent. Alternately, the ingredients may be incorporated by various means of mechanical mixing or by dry mixing and extruding into molding powder, etc.

The stabilizing synergizing adducts of this invention may be used in combination with other additives and in this connection reference is made to the anti-stain or whitening agents described in co-pending application filed June 22, 1962. Such additives are metallic soaps, the acidic portion of which has a molecular weight of about 116 to 340 and from about 8 to about 22 carbon atoms. Acids which are commonly used in preparing metallic soaps may be cyclic, straight or branch-chain saturated or unsaturated as typified by rosin, linseed oil fatty acids, hexoic acid ( a syn. octoic acid), and tall oil fatty acids. Naphthenic acids are derivatives of cyclopentane and cyclohexane obtained from naphthenic base petroleum. Abietic acid, the chief acid in rosin, is a derivative of phenanthrene. Other acids of the aliphatic type and include saturated and unsaturated members. Tall oil (QV) is composed more or less of fatty acid and rosin acids. For a more detailed description of metallic soaps and the acids used in their manufacture, reference is made to "Encyclopedia of Chemical Technology," edited by Kirk and Othmer, volume 5, pages 195–196 (1950) and published by the Interscience Encyclopedia, Inc., New York.

Metallic soaps which have proven especially useful as anti-stain agents include magnesium stearate, magnesium palmitate, calcium stearate, barium stearate, strontium palmitate, calcium monodecylphosphate, calcium monolaurylphosphate, zinc stearate and the like. Since the phenolic disulfides are a potential source of sulfur the metal of the metallic soap must not form colored sulfides as such products would impart coloration to the finally processed polymer.

It is, of course, well known to the art that the stabilizing effect of phenolic sulfides can be enhanced or amplified when used in combination with alkyl esters of 3,3'-thiodipropionic acid. It is to be pointed out, however, that the degree of stabilization using the aforesaid synergist in combination with a sterically hindered phenol is much greater than the combined effects of these single components. For instance, it might be predicted that the addition of a sterically hindered phenol such as 2,6-ditert.-4-methylphenol, a known albeit feeble stablizer for polyolefins, might merely add its stability factor when blended with a polyolefin previously stabilized with a phenolic disulfide and synergized with an ester of 3,3'-thiodipropionic acid. Such is not the case. The presence of a minute quantity of a sterically hindered 4-methylphenol to a polymer stabilized with a phenolic disulfide and 3,3'-thiodipropionic acid intensifies the efficacy of the phenolic disulfide/3,3'-thiodipropionic acid ester system many fold and this effect is manifestly not accountable by the stabilizing action per se of the sterically hindered phenol. In fact, the stabilization contributed by the sterically hindered 4-methylphenol is virtually nil as demonstrated by control experiments which showed that the sterically hindered phenol, in the amounts used in the invention, produced only an insignificant resistance to oxidation over the unstabilized polymer. However, as can be seen from the examples, the incorporation of minute amounts of a sterically hindered phenol in isotactic polypropylene stabilized with a phenolic disulfide type of stabilizer and dilauryl 3,3'-thiodipropionate as a synergizer results in tripling the oxidative resistance of the polymer as compared to the use of the thiodipropionate as the sole synergizer.

The following examples illustrate the procedure for preparing stabilized crystalline polypropylene compositions of the invention, although the inclusion of such examples is not to be taken as limiting or otherwise imposing any restriction on the invention, and it is to be understood that variations in practicing the same without departing from the scope or spirit thereof will be apparent to those skilled in the art to which the said invention pertains.

EXAMPLE 1

50 g. of isotactic polypropylene resin, 0.05 g. of 4,4'-dithiobis (2-sec.-amylphenol), 0.125 g. of dilauryl 3,3'-thiodipropionate, 0.025 g. of 2,6-ditert.-butyl-4-methylphenol and 10 ml. of methylene dichloride were intimately mixed in a Waring Blendor. The solvent then evaporated and 9.0 g. of the dry blend placed between the two plates of a Clifton hydraulic press for 6 minutes at a temperature of 400° F. The resulting 25 ml. polymer sheet was then die cut with a circular 1" die and the discs subjected to accelerated aging in a forced draft oven at 150° C. The time to embrittlement was 960 hours.

EXAMPLE 2

The procedure of Example 1 was again repeated but omitting the 2,6-ditert.-butyl-4-methylphenol. The time to embrittlement was 336 hours.

EXAMPLE 3

The procedure of Example 1 was again carried out but in this instance there was added to the mixture 0.063 g. of calcium stearate as a whitening or anti-stain agent. The stabilizing against aging was essentially the same as that obtained with the materials of the first example.

EXAMPLE 4

The procedure of Example 1 was repeated but substituting 4,4'-dithiobis (2-cyclohexylphenol) for the 4,4'-dithiobis (2-sec.-amylphenol). The stabilized polymer exhibited approximately the same resistance to oxidative degradation as that of the first example.

We claim:

1. A stabilized polymer composition comprising as the major component a solid isotactic polypropylene containing as a stabilizer therefor 0.05% to 5.0% of a monosubstituted bis phenolic disulfide of the following formula:

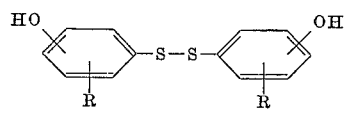

wherein R is a hydrocarbon residue selected from the class consisting of alkyl of from 1 to 20 carbon atoms, cyclopentyl, cyclohexyl, benzyl and phenyl, said R and OH never being meta with respect to each other, it being further provided that the OH function is excluded from occupying a position meta to the disulfide bridge, said stabilizer being synergized with 0.01% to 0.5% of a sterically hindered branched 2,6-dialkyl-4-methylphenol wherein each alkyl contains from 3 to 12 carbon atoms and 0.05% to 5.0% of a dialkyl ester of 3,3'-thiodipropionic acid wherein each alkyl contains about 12 carbon atoms.

2. A polymer composition according to claim 1 wherein the sterically hindered phenol is 2,6-ditert.-4-methylphenol.

3. A polymer composition according to claim 1 wherein the dialkyl ester of 3,3'-thiodipropionic acid is dilauryl 3,3'-thiodipropionate.

4. A polymer composition according to claim 1 wherein is added as a decolorizing agent a metallic salt consisting of the soaps of calcium, barium, strontium, magnesium and zinc.

5. A polymer composition according to claim 1 wherein the monosubstituted bis phenolic disulfide is 4,4'-dithiobis (2-cyclohexylphenol).

6. A polymer composition according to claim 1 wherein the monosubstituted bis phenolic disulfide is 4,4'-dithiobis (2-tert-butylphenol).

7. A polymer composition according to claim 1 wherein the monosubstituted bis phenolic disulfide is 4,4'-dithiobis (2-phenylphenol).

8. A polymer composition according to claim 1 wherein the monosubstituted bis phenolic disulfide is 4,4'-dithiobis (2-sec-butylphenol).

9. A polymer composition according to claim 1 wherein the monosubstituted bis phenolic disulfide is 2,2'-dithiobis (4-sec-butylphenol).

References Cited

UNITED STATES PATENTS

| | | | |
|---|---|---|---|
| 2,175,082 | 10/1939 | Hagen et al. | 260—45.95 |
| 2,985,617 | 5/1961 | Salyer et al. | 260—45.95 |
| 3,038,878 | 6/1962 | Bell et al. | 260—45.95 |
| 3,060,121 | 10/1962 | Orloff et al. | 260—45.95 |
| 3,100,229 | 8/1963 | Orloff et al. | 252—405 |
| 3,129,213 | 4/1964 | Worrel | 260—45.95 |
| 3,148,168 | 9/1964 | Harding | 260—45.95 |
| 3,173,890 | 3/1965 | Salyer et al. | 260—45.95 |

FOREIGN PATENTS 1,248,217   10/1961   France.

DONALD E. CZAJA, *Primary Examiner.*

LEON J. BERCOVITZ, *Examiner.*

H. E. TAYLOR, JR., *Assistant Examiner.*